United States Patent [19]

Poveromo

[11] Patent Number: 4,932,125

[45] Date of Patent: Jun. 12, 1990

[54] INTERNAL PIPE CUTTER

[76] Inventor: Michael Poveromo, 163 NE. Penlynn Ave., Port St. Lucie, Fla. 34983

[21] Appl. No.: 459,443

[22] Filed: Jan. 2, 1990

[51] Int. Cl.$^5$ .............................................. B23D 21/14
[52] U.S. Cl. ......................................... 30/103; 82/82; 82/100
[58] Field of Search ................. 30/103, 105, 115, 373, 30/388; 82/82, 83, 100, 113; 408/14, 16; 409/143, 200, 218

[56] References Cited

U.S. PATENT DOCUMENTS

| | | | |
|---|---|---|---|
| 3,717,056 | 2/1973 | Gracin et al. | 82/82 |
| 3,911,574 | 10/1975 | Jones | 30/105 |
| 3,999,292 | 12/1976 | Breese | 30/105 |
| 4,177,558 | 12/1979 | Brown | 30/103 |
| 4,177,559 | 12/1979 | Anderson | 30/105 |
| 4,307,512 | 12/1981 | Phillips | 30/103 X |
| 4,369,573 | 1/1983 | Vital | 30/105 |
| 4,466,185 | 2/1983 | Montiero | 30/103 |

Primary Examiner—Douglas D. Watts
Attorney, Agent, or Firm—Alvin S. Blum

[57] ABSTRACT

A cutting tool is designed to cut through plastic pipe from within. This operation is required when a pipe is mounted in a floor or wall and must be cut off below the level of the floor for installation of plumbing fixtures. A rotary shaft with a rotary saw blade at one end is adapted for rotating in an electric drill at a second end. The shaft is journaled in a sleeve. A locking collar is slideably mounted on the sleeve. The collar is locked on the sleeve at a particular level so that when the underside of the collar engages the cut end of the exposed pipe, the blade will cut the wall at the desired depth. The collar is kept in contact with the pipe end as the sleeve is moved in a circle against the inside of the pipe so that the inside cut will be at a uniform depth.

7 Claims, 1 Drawing Sheet

INTERNAL PIPE CUTTER

BACKGROUND OF THE INVENTION

The instant invention relates to a tool for cutting pipe and more particularly to a rotary cutting tool for cutting the wall of a pipe from inside the pipe through an opening at one end of the pipe.

It is common practice in the building construction industry for plumbers to install large diameter pipe, such as plastic waste pipe, before finish flooring is installed. The pipe is left overlong so that it may be cut down to the necessary level of the finish floor as required after the floor has been finished. If this level is above the finish floor, the pipe may be cut simply with a hacksaw. Generally, it is necessary to cut off the end at a level below the level of the floor for proper connection of a water closet, shower pan, or bathtub. There is not enough space around the pipe at the desired level to admit a hacksaw. The pipe is often cut away with a chisel or other hand tool which is awkward, labor intensive and may leave an irregular cut end. The problem has been recognized for some time, and U.S. Pat. Nos. 4,369,573 issued in January 1983 to Vitale; 4,177,559 issued to Anderson; and 4,177,558 issued to Brown in December 1979; 3,999,292 issued to Breese in December 1976; 3,911,574 issued in October 1975 to Jones; and 4,466,185 issued in August 1984 to Montiero provide rotary cutters that attempt to solve the problem.

The patented devices provide a variety of mechanisms for controlling the depth of cut to ensure cutting completely through the wall without extending beyond the outer wall and mechanisms for controlling the path of the cutting tool.

They are all quite complex so that they are difficult to operate, and expensive. The plumber is not anxious to invest in an expensive tool that has so limited an application so that most plumbers still use awkward hand tools that they already have in their toolboxes for other purposes even though they are not well suited to this application.

SUMMARY OF THE INVENTION

It is accordingly an object of the invention to provide a rotary cutter for cutting the inside of pipes that is simple to operate, and manufacture and that may be provided at low cost to the workman. It is another object of the invention to provide a tool that requires no adjustments.

In the situations where a plumber is most commonly required to cut a pipe below floor level, there is generally at least a small gap between the outside wall of the pipe and the finish floor. And there is not a great difference in thicknesses of the pipe walls. The invention takes advantage of these two facts by providing a long rotary shaft journalled in a long sleeve. A first end of the shaft is adapted for engaging in the chuck of an ordinary electric drill.

A simple, inexpensive, rotary saw blade of small diameter of the type readily available to the trade is mounted on the second end of the shaft where it extends from the sleeve. A flange having a flat surface perpendicular to the axis of the shaft is slideably mounted on the sleeve with a thumbscrew to lock it in place. The flange is adjusted to rest upon the end of the pipe when the blade is at the desired depth within the pipe. With the blade rotating, it is advanced through the wall at one point and then the sleeve is moved around the pipe through a complete circle with the flange still resting on the pipe. This cuts the pipe in a cut normal to the axis of the pipe without requiring any special skills of the operator. The radius of the blade extending beyond the sleeve is great enough to cut through the thickest pipe normally encountered. When cutting through the thinnest pipe normally encountered, the portion of the blade extending beyond the outside of the pipe is not great enough to encounter the flooring surrounding the pipe because of the gap normally left between pipe and flooring.

These and other objects, advantages and features will be best understood by reference to the accompanying drawings and detailed description.

DETAILED DESCRIPTION OF THE PREFERRED EMBODIMENT

Figures 1, 2, 3:
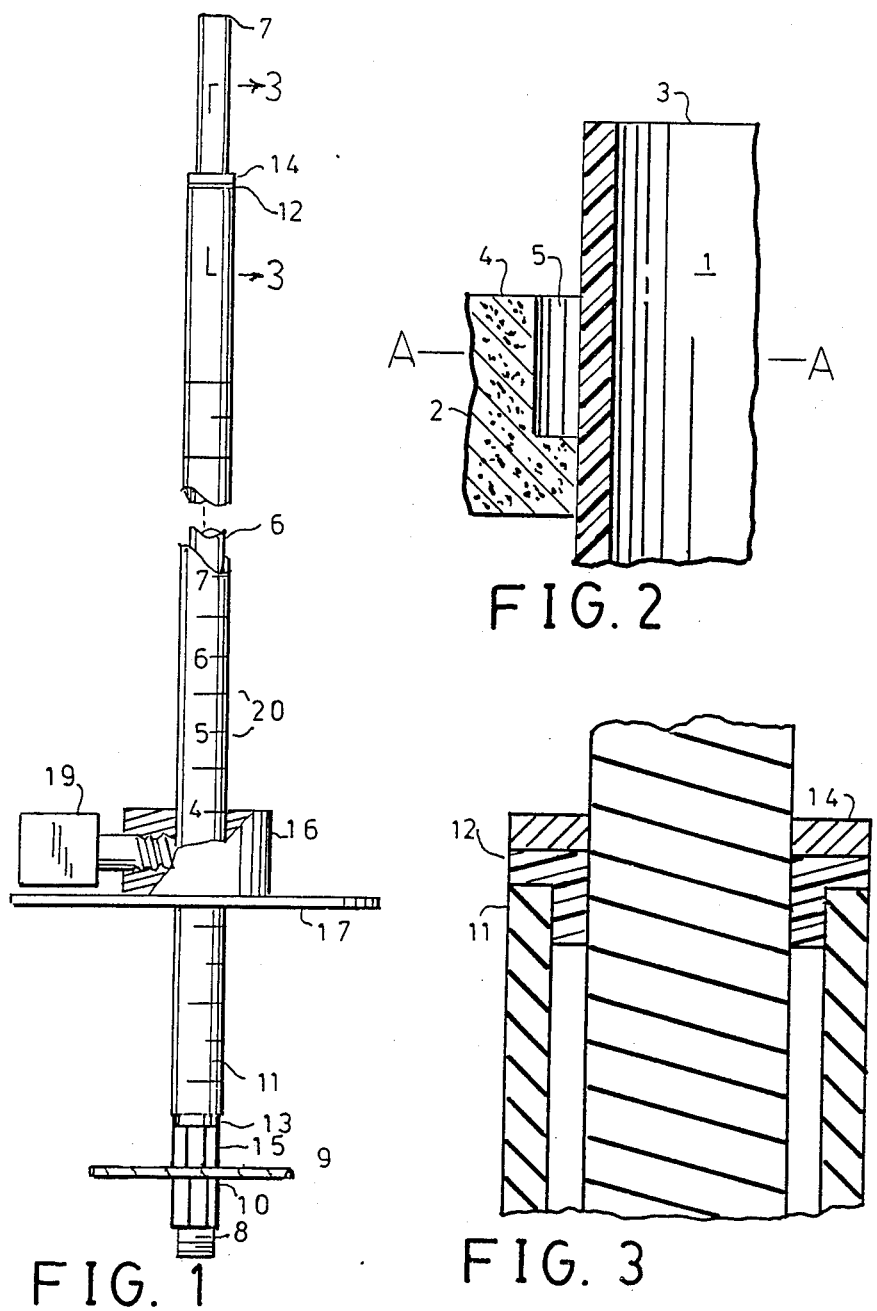
FIG. 1 is a side elevation, partially broken away, of a tool in accord with the invention.
FIG. 2 is a side elevation view, partially broken away and partially in section, showing a pipe embedded in concrete in a situation for which the tool of the invention is used.
FIG. 3 is a sectional view taken through the line 3—3 of FIG. 1.

Referring now first to FIG. 2, a vinyl plastic waste pipe 1 is embedded in a concrete floor 2 in the usual construction practice with the top 3 of the pipe cut off normal to the axis a considerable distance above the floor surface 4 to give the floor installer freedom to position the floor surface without concern for the pipe level. A space 5 is provided around the pipe to permit attachment of a floor flange to the pipe. The plumbing fixture is then attached to the flange. The pipe 1 must be cut below the level 4 of the floor, such as at A—A, for proper operation of the fixture. There is not enough room in space 5 to admit a hacksaw to cut the pipe from the outside.

Referring now to FIGS. 1 and 3, a rotary cutter tool of the invention comprises a straight central shaft 6 having a first end 7 adapted for chucking in an electric drill and a second end 8 bearing a saw blade 9 of the ordinary rotary saw blade type readily available to the trade. It is held in place by threaded nut 10 so that it may be readily replaced. The shaft 6 is rotatably held in rigid outer sleeve 11 and is journalled therein by upper sleeve bearing 12 and lower sleeve bearing 13. A collar 14 is fixed to the shaft by welding, pressing, cement and the like. The sleeve bearings 12 and 13 may be plastic or lubricant filled plastic for economy. Because the cutter is only used for brief intervals, this structure will be suitable and less expensive than metal bearing. In like manner, the threaded nut 15, threadably engaged on shaft 6 holds lower bearing 13 securely in place.

The flanged collar 16 is slideably mounted to the outer wall of sleeve 11. A thumbscrew 19 threadably mounted in the collar 16 can be used to lock the collar against the sleeve at any particular level. The sleeve 11 may have graduations 20 to help in adjusting the level of the collar 16. The collar 16 is adjusted so that when its lower surface 17 rests on top 3 of pipe 1 (FIG. 2), the blade 9 will be at the desired level A—A. The electric drill is held with one hand and the other hand holds collar 16 in place with the shaft vertical. The collar is rested on top of the pipe. With the blade rotating by drill action, the blade is forced through the wall of pipe 1. When the blade 9 has penetrated the pipe wall, the non-rotating sleeve 11 will engage the inner wall of the pipe and limit penetration of the blade before the blade can hit the concrete 2 surrounding the pipe. The blade may have a one and one quarter inch diameter that will suffice for the usual pipes which have a wall thickness of one quarter inch or less. The space 5 surrounding the pipe is generally greater than one inch so there is no danger of the blade striking concrete. When the blade has penetrated the wall of the pipe, the cutter is moved in a circle with the flanged collar 16 resting on the top of the pipe. This ensures that when the circle is completed, the end of the cut will meet the beginning so that the pipe will be cut off normal to its axis without requiring any special skill from the operator.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

What is claimed is:

1. A pipe cutter for inserting through a cut end of a pipe for cutting the pipe from the inside out, said cutter comprising:
    (a) an elongate, rigid shaft having a first end portion adapted for connection to a shaft rotating means and a second end portion with blade attaching means for removably attaching a rotary saw blade;
    (b) a rotatry saw blade having a diameter less than the inside diameter of said pipe, said blade removably attached to said second end by said blade attaching means to rotate with said shaft;
    (c) an elongate cylindrical sleeve member having a length less than that of said shaft;
    (d) a first bearing means rotatably connecting said shaft to a first end of said sleeve member at a point below said first end portion of said shaft;
    (e) a second bearing means rotatably connecting said shaft to a second end of said sleeve member at a point above said second end portion of said shaft;
    (f) a collar means for adjusting and guiding the level of cutting below said cut end of said pipe, said collar means being slidably mounted for axial sliding on said sleeve member, said collar means having a flat lower surface maintained in a plane substantially perpendicular to the axis of said sleeve member, said surface arranged for engaging said cut end of said pipe to maintain said blade at a fixed level as said sleeve is moved through a circle against the inside of said pipe while said blade cuts said pipe as said blade is rotated by said shaft rotating means, said flat lower surface extending radially beyond the radius of said blade a distance at least as great as the thickness of said wall to enable said cut end of said pipe to guide said collar means and thereby said blade level before said blade cuts said wall;
    (g) locking means connected to said collar means for removably locking said collar means on said sleeve member at a particular level; and
    (h) in which the radius of said blade exceeds the radius of said sleeve member by an amount at least as great as the thickness of the pipe wall to enable the wall to be cut through when said sleeve member engages said wall.

2. The pipe cutter according to claim 1, in which said first and second bearing means are plastic sleeve bearings with shoulders.

3. The pipe cutter according to claim 1, in which said blade attaching means includes a threaded shaft end and a threaded nut.

4. The pipe cutter according to claim 1, in which said locking means includes a threaded thumbscrew.

5. The pipe cutter according to claim 2, in which said blade attaching means includes a threaded shaft end and threaded nut and said locking means includes a threaded thumbscrew.

6. The pipe cutter according to claim 1, in which said sleeve member includes depth indicating indicia.

7. The pipe cutter according to claim 5, in which said sleeve member includes depth indicating indicia.

* * * * *